United States Patent

[11] 3,574,931

| [72] | Inventors | Mitsuaki Mochizuki<br>Suma-ku;<br>Minoru Tanaka, Okashi; Tadataka<br>Koyama, Takarazuka, Japan |
|---|---|---|
| [21] | Appl. No. | 697,554 |
| [22] | Filed | Dec. 26, 1967 |
| [45] | Patented | Apr. 13, 1971 |
| [73] | Assignee | Okazaki Manufacturing Company<br>Kobe, Japan |
| [32] | | July 20, 1967 |
| [33] | | Japan |
| [31] | | 42/46762 |

[54] METHOD FOR MANUFACTURING RESISTANCE-TEMPERATURE DEVICE
4 Claims, 15 Drawing Figs.

[52] U.S. Cl....................................... 29/613,
29/505, 29/509, 29/470, 29/618, 29/621
[51] Int. Cl......................................... H01c 1/02,
H01c 17/00
[50] Field of Search.......................................... 338/28, 30,
270, 273, 302; 339/276, 276 (C), 276 (B); 29/612,
613, 618, 621, 605, 505, 509, 470, 404, 28

[56] References Cited
UNITED STATES PATENTS

| 845,413 | 2/1907 | Haag............................ | 338/28 |
| 1,457,851 | 6/1923 | Nesbit.......................... | 338/25 |
| 2,604,341 | 7/1952 | Bergan......................... | 339/276 |
| 2,685,015 | 7/1954 | Weiller......................... | 338/28 |
| 3,334,322 | 8/1967 | Bales............................ | 338/28 |
| 2,893,182 | 7/1959 | Pies.............................. | 29/613 |

*Primary Examiner*—John F. Campbell
*Assistant Examiner*—Victor A. Di Palma
*Attorney*—Leonard S. Knox

ABSTRACT: The method of making a resistance-temperature measuring device comprising a dielectric support upon which a winding of resistance wire is carried. The ends of the winding are connected to terminal leads. Sufficient excess turns are allowed so that the resistance value may be calibrated by cutting off one end of the winding. The end of the winding remote from the leads is temporarily anchored pending calibration, temperature characteristic and rapid and accurate response.

Patented April 13, 1971　　3,574,931
2 Sheets-Sheet 1
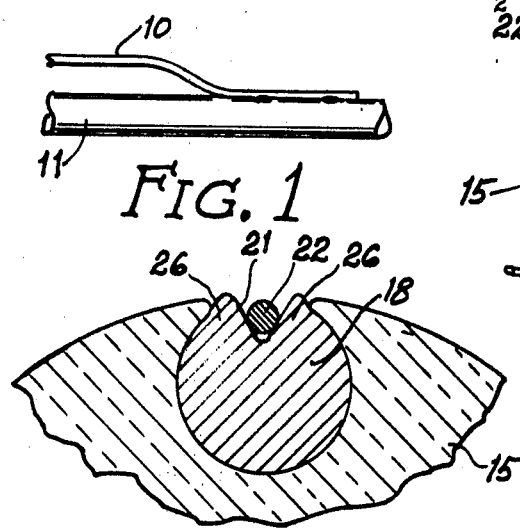
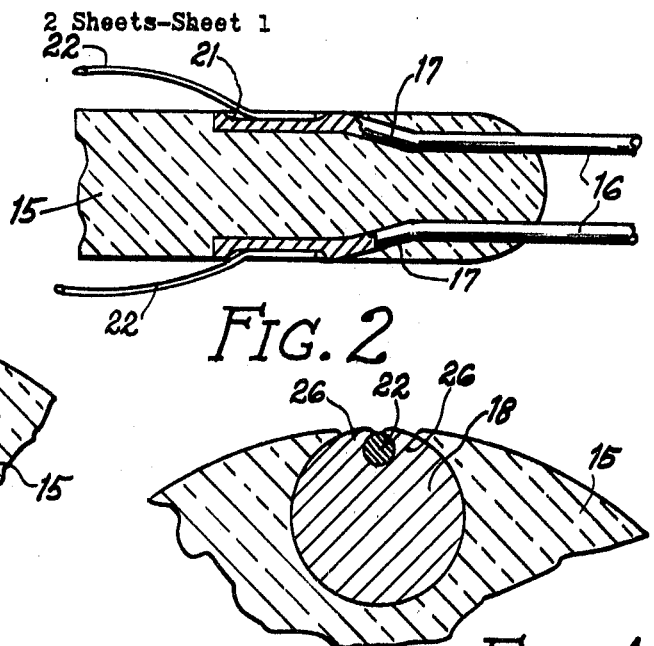
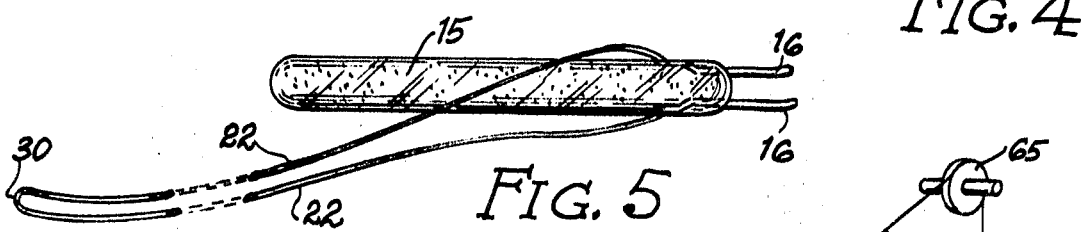
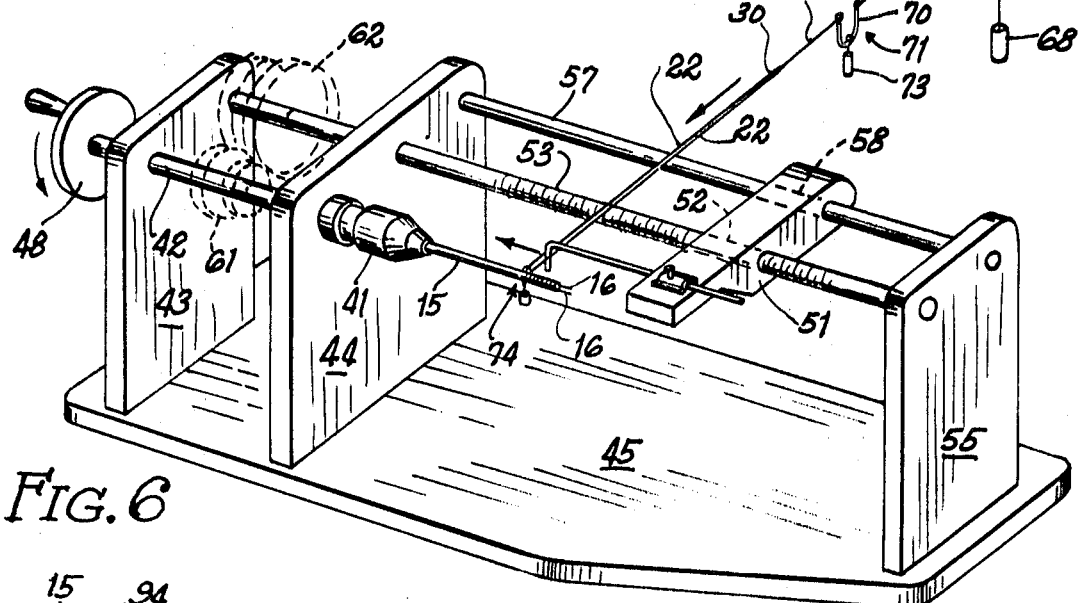
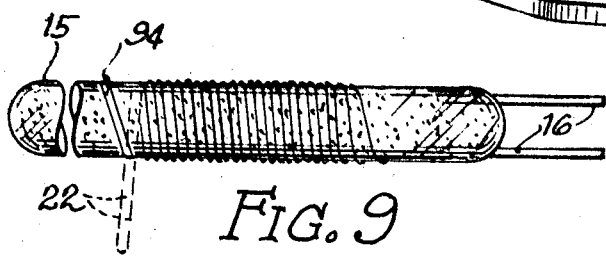
INVENTORS
Mitsuaka Mochizuki
Minoru Tanaka
Tadataka Koyama
Leonard S. Knox Atty Patented April 13, 1971  3,574,931
2 Sheets-Sheet 2
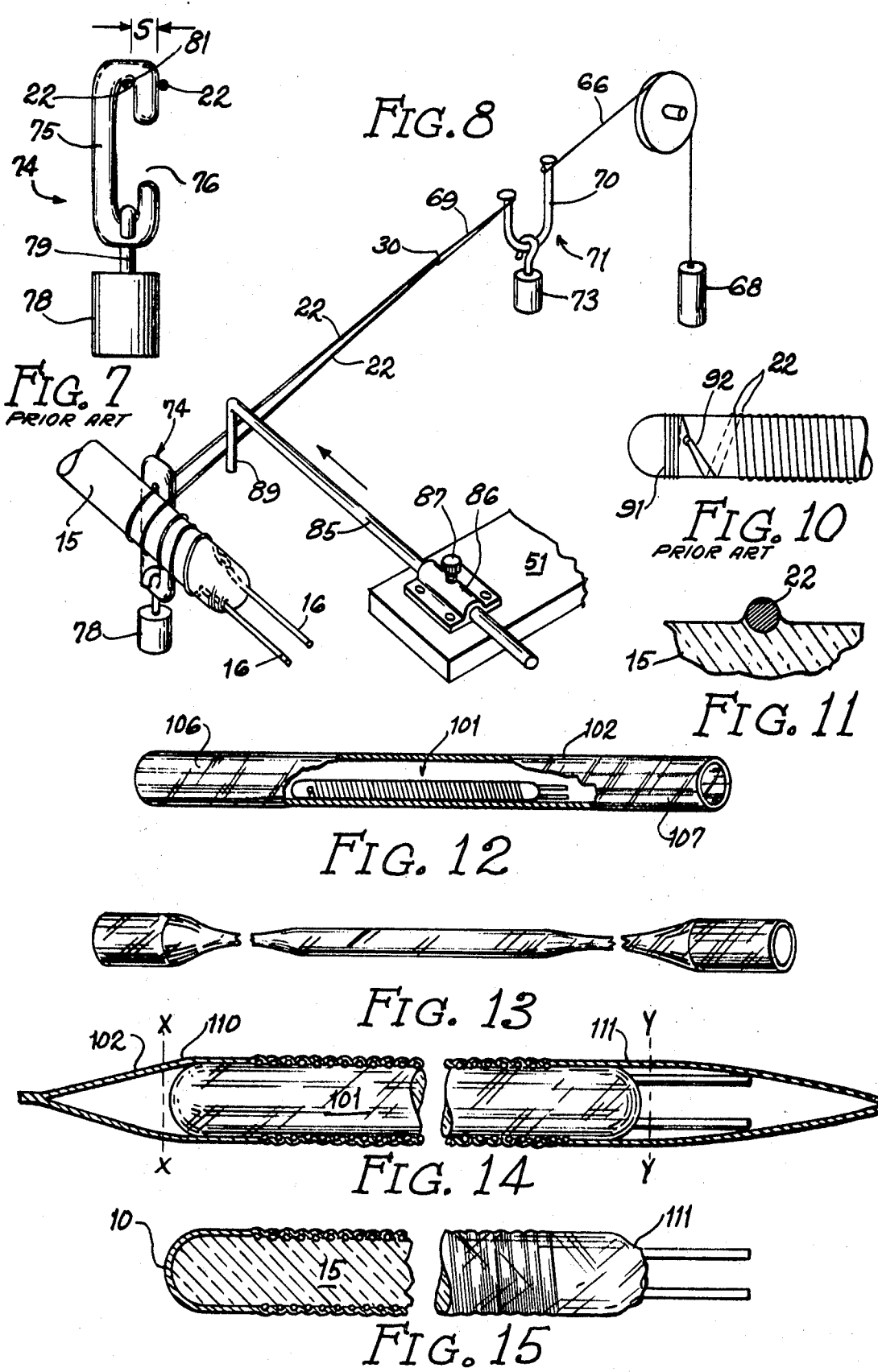

METHOD FOR MANUFACTURING RESISTANCE-TEMPERATURE DEVICE

This invention relates to a resistance-type temperature measuring device having extremely accurate response and ruggedness, as well as to the method of fabricating the same and the apparatus utilized therein.

Resistance-type temperature measuring devices are based on the principle that the resistance of a conductor changes when subjected to variation in ambient temperature. For compactness, such devices are commonly utilized in a form wherein the conductor is coiled upon a dielectric support in order that the temperature sensed is that existing in a restricted zone. A typical device of this class is so designed as to carry a maximum current of 5 ma. and to change its resistance from about 100 ohms to 140 ohms when the ambient temperature changes from 0° C. to 100° C. The completed device has an exterior diameter of about 3.0 mm. and a length of about 35 mm. exclusive to the terminal leads. The coil comprises platinum wire of 0.04 mm. diameter with the turns separated by 0.1 mm. and is embedded in glass.

Among the objects of the invention is to provide a device as aforesaid which has increased resistance to mechanical shock, faster response, higher accuracy and reproducibility in quantity on a commercially feasible scale.

The invention also relates to novel steps in the fabrication of a device as described and the apparatus employed therein, whereby the extremely fine wire may be coiled on its support with uniform pitch and without twisting of the wire on its axis. Further the invention comprehends the steps of encapsulating the support and its thereon-carried coil to provide a commercially practical unit having manifold advantages.

In a particular aspect the invention relates to the joining of the fine wire of the coil to the comparatively larger wire constituting the terminal leads of the device and a construction which is especially economical in its use of noble metals.

Other objects and advantages of the invention will become apparent from the following description which, taken with the accompanying drawings, discloses preferred modes in which the several aspects of the invention may be carried into practice.

In these drawings:

FIG. 1 shows prior practice in effecting a junction between a lead wire and the end of the wire forming the resistance element;

FIG. 2 is a longitudinal cross section through one end of the support to show the improved junction of the invention;

FIG. 3 shows one step in fabricating the junction of FIG. 2;

FIG. 4 shows a step subsequent to that of FIG. 3;

FIG. 5 shows the support and the length of wire prior to coiling of the latter;

FIG. 6 is an isometric view of apparatus utilized in winding the coil on its support;

FIG. 7 is a somewhat enlarged detail of an adjunct used in attaining uniform spacing between the turns of the coil;

FIG. 8 is an enlarged isometric detail of portions of FIG. 6;

FIG. 9 shows the coil completely wound and the looped end thereof anchored to the support;

FIG. 10 illustrates the prior practice of anchoring the end of the coil;

FIG. 11 is a cross section in detail to show the integration of the coil with its support before encapsulation;

FIGS. 12, 13 and 14 illustrate steps in encapsulating the coil and support; and

FIG. 15 shows the completed device.

Broadly regarded, the device of the invention comprises a dielectric support upon which the resistance wire is wound, usually in a bifilar configuration, the beginning ends of the turns being connected to terminal leads located at one end of the support and the remote end being anchored on a pin embedded in the support. The turns, including the end portions thereof, are reliably united to the support by embedment therein. The assembly as thus constituted is encapsulated in a dielectric layer which virtually surrounds the turns of the coil and, in the case where the dielectric is glass, fusion is resorted to in order to achieve a completely integrated structure.

In another aspect of the invention comprehends novel steps in fabricating the device as referred to in the preceding paragraph, in particular: the method of forming the junction between the ends of the element and the heavier terminal leads, the winding of the coil on its support with uniform pitch and without twisting of the wire on its axis; the anchoring of the distal end of the coil to the support, the integration of the coil with its support to assure maintenance of the wound condition, and the encapsulation of the support and the coil.

In a further aspect the invention has relation to improvements in the winding apparatus whereby uniform spacing between the turns of the coil may be accomplished in a simple manner by an adjunct which is capable of being rapidly installed and adjusted for various spacings. Further the apparatus includes means to restrain the length of wire being coiled from twisting on its axis.

Now adverting to the drawings there is shown, FIG. 1, a prior mode of splicing the fine wire 10 comprising the resistance coil to the comparatively heavier wires 11 forming the terminal leads of the device. In accordance with such prior practices wires 10 and 11 of each set are held side-by-side manually and the same then spot-welded together. The attendant problems have been: (1) abnormally strained attention on the part of the operative to maintain the wires in proper relation pending welding, (2) the proportioning of the heat of welding in the case of wires of the magnitude involved is extremely difficult; if too great, the fine resistance wire will evaporate and, if insufficient, the larger diameter wire absorbs heat to the detriment of the smaller and (3) there exists no practical way of determining whether the completed splice is capable of resisting mechanical shock and embrittlement incident upon heating and cooling.

In accordance with the invention, securement of the beginning ends of the resistance wire to the terminal leads is achieved in a manner which avoids the several disadvantages just noted. Thus referring to FIGS. 2, 3 and 4 a section 15 of glass rod upon which the coil is to be wound is provided with a pair of terminal leads 16—16. For reasons which will become evident the section 15 is initially somewhat longer than its finished length. The leads 16—16 are offset at 17—17 in such manner that the ends 18—18 lie flush with the outer surface of the support. After this the ends 18 are grooved as at 21 for a short distance, in the example 1.5 mm., the transverse extent and shape of the groove being such as to receive the end of the finer wire 22 which is to constitute the coil, as indicated in FIG. 3. The position of the wire 22 within the groove is such that the walls 26–26 thereof may be squeezed or rolled over to embrace the wire 22 (FIG. 4). Even the burr raised on each side by the grooving cutter, when turned back, may be sufficient to hold the finer wire adequately. The end result is that the wires 22–22 are gripped, as in a vise. At this juncture it is deemed pertinent to emphasize that, in typical devices, the resistance wire is on the order of 0.03 to 0.07 mm. (0.0018 inch to 0.0028 inch in diameter and the terminal leads on the order of 0.3 to 0.5 mm. (0.018 inch to 0.0197 inch in diameter. Finally the wires 18 and 22 are preferably further secured by welding. In this case the prior mechanical splicing serves to bring the two wires into good heat-conducting relation so that the heat of welding is properly distributed and a reliable junction is attained.

Since, in the example, the coil of resistance wire is wound bifilar the subassembly, following the steps described, will appear as in FIG. 5, with the return loop indicated at 30.

The support 15 is now gripped at its left end in a chuck or collet 41 carried at one end of a spindle 42 rotatably supported in standards 43 and 44 carried on a baseplate 45. A handwheel 48 is keyed to the outer end of the shaft 42.

A carriage 51 has a threaded hole 52 engaged with a lead screw 53 journaled in the standards 43 and 44 and a third standard 55. A fixed guide rod 57, secured at its ends in the standards 44 and 55, is slidably received in a bore 58 in the carriage 51 to constrain the same to move in a straight path pursuant to rotation of the lead screw. Change gears 61 and 62 of any desired ratio translate the rotational speed of the chuck 41 into a predetermined longitudinal speed of the carriage 51. As will be understood such ratio is determined jointly by the predetermined pitch of the turns of the coil and the speed of the spindle 42.

An outboard bracket (not shown) carries an idler sheave 65 over which a length of cord 66 is arranged to run. The depending end of the cord carries a weight 68 selected to apply appropriate tension to the wires 22–22 as they are wound. Inasmuch as the wires 22–22 are so fine and prone to damage if allowed to twist and kink, provision is made to obviate such behavior. To this end a device 71 is interposed between the cord 66 and another piece of cord 69. This device comprises a piece of rigid wire 70 bent into horseshoe shape and having a weight 73 of sufficient size hung on the bight to maintain the cord 69 and hence the wires 22–22 in a predetermined position i.e. with the wires in a common plane essentially tangent to the surface of the support 15. The ends of the cords 66 and 69 are secured in any convenient manner to the legs of the horseshoe member 70.

To establish and maintain some predetermined spacings S (FIG. 7) of the turns of the wires 22–22 an adjunct 74 as there shown is employed. This device comprises a piece of wire bent into the form of a loop 75 but interrupted at 76 in order that the same may be hung over one of the wires 22, e.g. the left-hand one. The diameter of the wire of the loop 75 is so selected that, when the loop is located in working position as shown the space S will be maintained as winding proceeds. A weight 78 having a hook 79 is suspended from the lower bight of the loop 75 to maintain this latter in its prescribed position. To insure greater accuracy the inside corner 81 of the loop may be squared off. It will be apparent that the spacing S will be the pitch less one wire diameter, and that different adjuncts 74 will be used whenever the dimension S and/or the gauge of the wire 22 is changed. If the adjunct is employed in a situation where two wires of different diameters are being wound then S will be the pitch less the sum of the radii of the two wires. Moreover, it will be understood that, where more than two wires are being wound, the portion of the device intermediate the wires will be in plural.

As previously noted the wires 22–22, together with the device 74 are advanced to the left as the support 15 is rotated. To this end the carriage 51 is provided with a rod 85 adjustably held in a socket 86 by a knurled-head screw 87. The left-hand end 89 of the rod 85 is bent to bear against the right-hand one of the wires 22–22. It will be noted that the point at which the end 89 abuts the wire is as close as practicable to the support 15 in order that the feeding pressure thereof is utilized optimally, without the hazard of deforming the wires or detracting from the uniform winding thereof on the support.

It will have become apparent that the method and apparatus herein disclosed avoids any touching of wire with the fingers. It has been found that perspiration or soil which would otherwise be deposited on the wires, can, in the case of high precision temperature-sensing elements, seriously detract from accuracy.

One prior method of insuring that the turns would not slip longitudinally on the support involved the provision of a helical groove on the surface of the latter. Due to the smallness of the components this expedient was far from satisfactory, for example, the pitch of the grooves could not be made less than 0.3 mm. Furthermore the pitch of the groove was different for each different pitch of the turns. In accordance with the instant disclosure the lateral surface of the support is roughened in some suitable manner, e.g. by means of a hydrofluoric acid etch or sandblasting.

In accordance with prior practice the far end of the winding was retained by attaching a length 91 of the same, e.g. platinum (FIG. 10) to the loop 92 and wrapping the same around the support several times to serve as an anchor. Such practice was unreliable and wasteful in terms of the excess platinum wire. The present disclosure provides for a pin 94 (FIG. 9) to be embedded in the support in a position close to the last turn so that the loop 30 may be held thereon. This pin is desirably installed when the support is still in the chuck. In this way, not only is the end of the coil reliably secured but wasteful consumption of costly wire is avoided.

The next step is to fix the turns of the winding against longitudinal slippage. Referring to FIG. 11, heat is applied to soften the glass to point where the wire will become integrated with the support by fusion. The result is to cause the wires 22 to sink partially into the support and the glass to rise around the wires by capillary action to provide a unified structure.

Following this step the desired resistance of the coil is determined by employing any suitable instrument and the two wires 22 are welded together at the point thus ascertained. The short length of the wires beyond the weld and extending to the pin 94 becomes mere surplusage. However since the ultimate length of wire can be predetermined within close limits, especially in the case of production runs, this surplusage can be readily minimized. Any excess length of the support 15 and wire then remaining is cut off.

The component constituted as aforesaid, indicated at 101 in FIG. 12, is then positioned within a section of glass tubing 102 and, while rotating this subassembly, heat is applied over the coextensive region of the parts 101 and 102 and for some short distance at each end to soften the tubing, whereafter the end portions 106 and 107 are grasped and longitudinal traction is applied. The end result is shown in FIG. 13 wherein the tubing 102 is constricted into embracing relation with the component, the wall thereof having been rendered sufficiently plastic to flow around, and incorporate itself with the wires 22–22 (FIG. 14). Thus the winding is fully protected on all sides.

Next, the tubing 102 is cut off at the lines X–X and Y–Y in planes so selected that the remnants 110 and 111 are sufficient, when rendered plastic, to be formed around the ends of the support 15 which are also heated to the stage where the adjoining surfaces will fuse. The completed device, with the terminal leads protruding, then appears as in FIG. 15.

By completely enclosing the resistance wire in glass, voids are eliminated. It has been found that air pockets around the wire will, to some extent, interfere with outward conduction of heat by reason of current flow therethrough and, by the same token, interfere with heat exchange between the medium whose temperature is being measured and the wire.

Interference with conduction of heat, whether inwardly or outwardly, evidences itself in slower response and decreased accuracy.

Heretofore it was thought to be necessary to allow freedom of movement of the wire so that expansion and contraction could occur pursuant to heating and cooling. In such case it was assumed that the deleterious effects of air space had to be tolerated. However, by selecting glass having essentially the same coefficient of expansion as the material of the wire and utilizing the method of fabrication disclosed herein it has been found unnecessary to allow for freedom of movement of the turns of the coil.

While we have shown particular embodiments of our invention, it will be understood, of course, that we do not wish to be limited thereto since many modifications may be made and we, therefore, contemplate by the appended claims to cover any such modifications as fall within the true spirit and scope of our invention.

We claim:

1. The method of fabricating a device of the class described comprising:
    A. a. providing a dielectric support of fusible material,
    b. winding an electrical conductor on the support,
    c. heating the support to render the same plastic,
    d. partially embedding the conductor in the support to to fix the wound condition of the same, e. locating the support and its thereon-carried conductor in a tubular section of fusible material,
f. heating the section to render the same plastic,
g. stretching the section while plastic, to constrict the same into intimate relation with the support and winding,
h. continuing application of heat to unite the section and support, and
i. cooling the assembly.

2. The method of fabricating a resistance-temperature device which includes a wound electrical conductor, a dielectric support of fusible material therefor and leads terminating the conductor, comprising the steps of:
a. heating the support to render the same plastic,
b. embedding the leads in the support with a portion of the leads exposed at the exterior surface of the support,
c. joining the one end of the conductor to said lead,
d. winding the conductor on the support,
e. rendering a limited region of the support adjacent the termination the termination of the winding plastic by application of heat,
f. embedding a pin in said region with a portion of the pin protruding from the support,
g. cooling the assembly,
h. attaching said termination of said pin,
i. calibrating the resistance of the winding,
j. applying heat to the support to fuse the calibrated length of winding thereto, and
k. cutting off the unused length of conductor, pin and support.

3. The method of fabricating a resistance-temperature device which includes a bifilar electrically-conductive coil comprising the steps of:
a. providing a dielectric support fusible material having a pair of terminals at one end,
b. providing a length of electrical conductor bent upon itself to form a bight at its midpoint,
c. attaching the free ends of the conductor to respective ones of said terminals,
d. winding the conductor on the support in bifilar array,
e. rendering the support plastic by heating in a restricted region about the location of the bight,
f. embedding a portion of a pin in said region, and
g. engaging the bight over the pin to secure the end of the winding.

4. The method of fabricating a resistance element wound on a fusible dielectric support comprising:
a. bending a length of resistance wire at approximately its midlength to form a U-shape,
b. anchoring the free ends of the legs of the U to the support adjacent one end thereof,
c. winding the wire on the support with the legs of the U in parallel relation,
d. attaching a pin to the support adjacent the other end thereof and beyond the last turn of the winding,
e. securing the bight end of the U to the pin,
f. calibrating the resistance value of the winding by cutting the same,
g. securing at least the cut end of the winding to the support by heating the support to partially embed said cut end in the support, and
h. cutting off the support, pin and surplus wire.